(12) United States Patent
Berginc et al.

(10) Patent No.: US 8,345,960 B2
(45) Date of Patent: Jan. 1, 2013

(54) METHOD FOR THE THREE-DIMENSIONAL SYNTHETIC RECONSTRUCTION OF OBJECTS EXPOSED TO AN ELECTROMAGNETIC AND/OR ELASTIC WAVE

(75) Inventors: Gérard Berginc, Thiais (FR); Ion Berechet, Vincennes (FR); Stefan Berechet, Fontenay-Sous-Bois (FR)

(73) Assignees: Thales, Neuilly-sur-Seine (FR); SISPIA, Vincennes (FR)

( * ) Notice: Subject to any disclaimer, the term of this patent is extended or adjusted under 35 U.S.C. 154(b) by 320 days.

(21) Appl. No.: 12/934,101

(22) PCT Filed: Mar. 24, 2009

(86) PCT No.: PCT/EP2009/053447
§ 371 (c)(1),
(2), (4) Date: Sep. 23, 2010

(87) PCT Pub. No.: WO2009/118314
PCT Pub. Date: Oct. 1, 2009

(65) Prior Publication Data
US 2011/0019906 A1 Jan. 27, 2011

(30) Foreign Application Priority Data
Mar. 25, 2008 (FR) .................. 08 01591

(51) Int. Cl.
*G06K 9/00* (2006.01)

(52) U.S. Cl. ...................... 382/154; 382/285

(58) Field of Classification Search .................. 382/103, 382/107, 154, 276, 285; 348/47–60; 345/7, 345/8, 9, 55, 156, 157, 158, 419, 427, 632, 345/633, 473, 474, FOR. 209; 702/152, 702/153; 463/36, 37; 715/757, 852
See application file for complete search history.

(56) References Cited

U.S. PATENT DOCUMENTS

| 6,531,699 | B1 | 3/2003 | Micheron et al. |
| 7,184,071 | B2 * | 2/2007 | Chellappa et al. ............... 348/46 |
| 2002/0106135 | A1 | 8/2002 | Iwane |
| 2003/0117402 | A1 | 6/2003 | Hubrecht et al. |
| 2004/0032980 | A1 * | 2/2004 | Harman ........................ 382/154 |

FOREIGN PATENT DOCUMENTS

| EP | 1486920 | 12/2004 |
| EP | 1862969 | 12/2007 |
| FR | 2699684 | 6/1994 |
| WO | 2007101816 | 9/2007 |

\* cited by examiner

*Primary Examiner* — Brian Le
(74) *Attorney, Agent, or Firm* — Baker & Hostetler LLP

(57) ABSTRACT

A method for synthetic reconstruction of objects includes: extracting criteria from a knowledge base; extracting, from sensed signals filtered by the criteria, weak signals; extracting, from the weak signals, weak signals of interest; removing noise from and amplifying the weak signals of interest and obtaining useful weak signals; identifying useful direct information, from useful weak signals filtered by the criteria and supplying optimum criteria; reconstructing, using the useful direct information, information of interest; reconstructing, using the information of interest, useful information and supplying optimum criteria; reconstructing, based on the useful information, three-dimensional information, supplying a recognition state file and supplying the optimum criteria; and updating the criteria with the optimum criteria.

17 Claims, 2 Drawing Sheets

METHOD FOR THE THREE-DIMENSIONAL SYNTHETIC RECONSTRUCTION OF OBJECTS EXPOSED TO AN ELECTROMAGNETIC AND/OR ELASTIC WAVE

CROSS-REFERENCE TO RELATED APPLICATIONS

This application is a National Stage of International patent application PCT/EP2009/053447, filed on Mar. 24, 2009, which claims priority to foreign French patent application No. FR 08 01591, filed on Mar. 25, 2008, the disclosures of which are incorporated by reference in their entirety.

FIELD OF THE INVENTION

The field of the invention is that of the three-dimensional synthetic reconstruction of objects exposed to an electromagnetic and/or elastic wave. It is obtained starting from sensed signals produced by this exposure. The invention is more particularly applicable to the reconstruction of objects starting from very noisy weak signals.

BACKGROUND OF THE INVENTION

By way of non-limiting example, "weak signals" are signals for which:
the signal/noise ratio is low and/or
the amplitude or the intensity is low and/or
the information contained is fragmented and/or
the information contained is composed of micro-events in coincidence or in occurrence.

This method is designed to assist the actors from the industrial and medical world, from security and from defense, to control the processes of identification in a reliable manner for the management of performances and of risks.

Synthetically reconstructing an object illuminated by a laser over a wide range of wavelengths is a problem that covers a broad spectrum of theoretical and industrial applications in: the field of security and of defense (for example the identification of an IED—acronym for "Improvised Explosive Device") or the field of civilian transport (for example the identification of a pedestrian or a vehicle in the field of transport safety) or the medical field (for example the tomographic identification of cancerous cells in a tissue).

However robust the detection systems employed, the information supplied in these very noisy environments requires innovative data and knowledge processing methods enabling the object to be localized and synthetically reconstructed without loss of spatial resolution and it to be identified in a reliable manner.

Numerous scientific, technical and industrial studies have been undertaken in the field of inversion problems; the results obtained remain unsatisfactory due to their high sensitivity to the variations in the measurement parameters coming from weak signals, from the environment and from the instability of the system as a whole. The development of methods for inversion processing and reliable reconstruction allowing a resolution compatible with the systems used remains a major problem for the industry.

By way of non-limiting example, the difficulties encountered in the conventional methods of three-dimensional reconstruction starting from objects illuminated by an electromagnetic wave or excited by an elastic wave have as sources:

the propagation noise,
the instability of the sensor with respect to the objects,
the noise of the sensor and of the associated electronics,
the high spatial and time resolution imposed,
the unknown structure of the total noise,
the need for correlating in real time,
the variation in real time of the information,
the non-linear problem associated with the inversion,
the high non-linearity of the behavior of the signal.

SUMMARY OF THE INVENTION

The aim of the invention is to overcome these drawbacks.
More precisely, the subject of the invention is a method for synthetic reconstruction of an object exposed to a wave, starting from sensed signals produced by this exposure and from a knowledge base. It is principally characterized in that the knowledge base comprises filtering criteria, namely direct mode search criteria, criteria for extraction of the weak signals, criteria for identification in direct mode, three-dimensional observation grids linked to the illumination or reception angle of the wave, criteria for three-dimensional observation grids, three-dimensional reconstruction criteria, rules for optimization associated with said criteria, and corresponding optimum criteria, in other words following said optimization rules, and in that the method comprises the following steps consisting in:

extracting, from the knowledge base, direct mode search criteria,
extracting, from the knowledge base, criteria for extraction of the weak signals,
extracting, from the knowledge base, criteria for identification in direct mode and the associated rule,
extracting, from the knowledge base, three-dimensional observation grids and the associated rule for optimization,
extracting, from the knowledge base, criteria for three-dimensional observation grids and the associated rule,
extracting, from the knowledge base, three-dimensional reconstruction criteria and the associated rule,
extracting, from a set of signals filtered through the extracted direct mode search criteria, weak signals,
extracting, from the weak signals filtered through the criteria for extraction of the extracted weak signals, weak signals of interest,
removing the noise from the weak signals of interest so as to obtain useful weak signals,
if the rule for optimization of the criteria for identification in direct mode, coming from the knowledge base, is satisfied by the useful weak signals, then:
  i. these extracted criteria for extraction in direct mode are optimum criteria for extraction in direct mode,
  ii. update the knowledge base with said optimum criteria for extraction in direct mode,
  iii. the extracted direct mode search criteria are optimum direct mode search criteria,
  iv. update the knowledge base with said optimum direct mode search criteria,
  v. identify useful direct information, based on the useful weak signals filtered through the criteria for identification in direct mode,
otherwise, change these criteria for extraction in direct mode in the knowledge base and reiterate the steps for extraction of these criteria, of the weak signals of interest, of the useful weak signals, the step for the identification of useful direct information and the step concerning the rule for optimization of the new criteria for extraction of the weak signal, and if the rule for optimization of the criteria for identification in direct mode is not satisfied by the useful weak signals, then change these direct mode search criteria in the knowledge base and reiterate the steps for extraction of these criteria, of the weak signals, of the weak signals of interest, of the useful weak signals, the step for the identification of useful direct information and the step concerning the rule for optimization of the new extraction criteria, if the rule for optimization of the three-dimensional observation grids is satisfied by the useful direct information, then:

i. these extracted three-dimensional observation grids are optimum three-dimensional observation grids, ii. update the knowledge base and the three-dimensional observation grids with these optimum three-dimensional observation grids, iii. reconstruct, based on the useful direct information filtered through the extracted three-dimensional observation grids, three-dimensional information of interest, otherwise, change these three-dimensional observation grids in the knowledge base and reiterate the step for extraction of grids and the step concerning the rule for optimization of these new grids;

if the rule for optimization of the criteria for three-dimensional observation grids is satisfied by the three-dimensional information of interest, then:

i. these extracted criteria for three-dimensional observation grids are optimum criteria for three-dimensional observation grids, ii. update, in the knowledge base, the criteria for three-dimensional observation grids with these optimum criteria for three-dimensional observation grids, iii. reconstruct, based on the three-dimensional information of interest, filtered through the extracted criteria for three-dimensional grids, useful three-dimensional information, otherwise, change these criteria for three-dimensional observation grids in the knowledge base, and reiterate the step for extraction of the grid criteria and the step concerning the rule for optimization of these new criteria, if the rule for optimization of the three-dimensional reconstruction criteria is satisfied by the useful three-dimensional information, then:

i. these extracted three-dimensional reconstruction criteria are optimum three-dimensional reconstruction criteria, ii. update, in the knowledge base, the three-dimensional reconstruction criteria with these optimum three-dimensional reconstruction criteria, iii. reconstruct, based on the useful three-dimensional information, filtered through the extracted three-dimensional reconstruction criteria, three-dimensional information for the object and determine a recognition state file, otherwise, change these three-dimensional reconstruction criteria in the knowledge base and reiterate the step for extraction of the criteria for reconstruction and the step concerning the rule for optimization of these new reconstruction criteria.

Preferably, the method also comprises a step for amplification of the noise-free signals.

BRIEF DESCRIPTION OF THE DRAWINGS

Other features and advantages of the invention will become apparent upon reading the detailed description that follows, presented by way of non-limiting example and with reference to the appended drawings in which.

From one figure to another, the same elements are identified by the same references.

DETAILED DESCRIPTION

Figure 1:
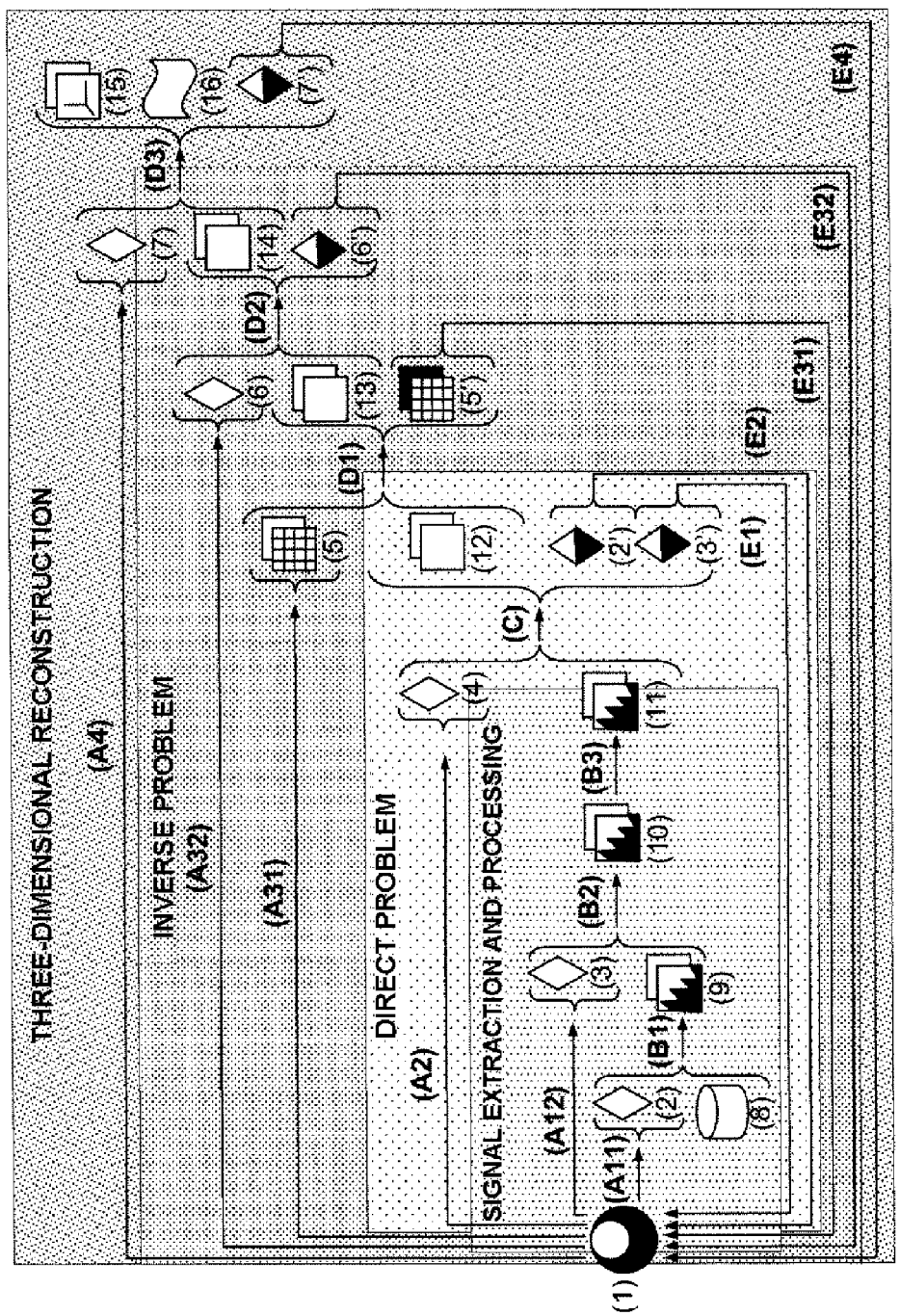
FIG. 1 shows schematically the method according to the invention.

The method according to the invention is applicable to the three-dimensional synthetic reconstruction of objects exposed to an electromagnetic wave such as the electromagnetic wave generated by a laser in the range of the wavelengths going from the visible to the infrared and/or generated by microwaves going from the sub-millimeter range up to the meter range. The objects may also be exposed to an elastic wave such as a wave in the infrasound, sound or ultrasound range.

The method relies on a reference knowledge and data base, henceforth denoted as knowledge base (1) that comprises data coming from physical measurements and/or from results of physical models and/or from knowledge in the field and/or from empirical knowledge of the expert in the field. More precisely, it comprises:

direct mode search criteria (2),
criteria for extraction of weak signals (3),
criteria for identification in direct mode (4),
three-dimensional observation grids (5),
criteria for three-dimensional observation grids (6),
three-dimensional reconstruction criteria (7),
rules for optimization associated with said criteria (4), (5), (6), (7),
and also corresponding optimum criteria and grids (2'), (3'), (5'), (6'), (7').

These criteria are criteria for filtering signals or information.

By way of non-limiting example, the criteria for searches in direct mode 2 are criteria coming from amplitude correlations and/or from scattered intensity correlations and/or from time sequences and/or from probability densities and/or from spectral signatures and/or from time correlations. Searching in direct mode is the extraction of useful energy information from the sensed signals produced by the exposure of the object to a wave, in order to obtain weak signals, as indicated hereinbelow with reference to FIG. 1. This is typically a filtering of weak signals. The direct mode search criteria are then criteria for extraction of the sensed signals, in other words filtering criteria for the sensed signals in order to select weak signals.

By way of non-limiting example, the criteria for extraction of the weak signals (3) are criteria coming from the threshold and/or from the range and/or from the domain of evaluation for the direct mode search criterion.

By way of non-limiting example, the criteria for identification in direct mode (4) are criteria coming from the predefined class or classes to which the object belongs.

By way of non-limiting example, the three-dimensional observation grids (5) are grids (in the sense of "reading grids") linked to the angle of the illumination laser beam and/or to the angle of the reception laser beam or to the angle of the excitation ultrasound beam and/or to the ultrasound reception angle. These are therefore grids linked to the illumination or reception angle of the beam of the wave.

By way of non-limiting example, the criteria for three-dimensional observation grids (6) are values of the illumination laser angle and/or of the reception laser angle and/or of the pitch of the illumination laser angle and/or of the pitch of the reception laser angle or values of the ultrasound excitation angle and/or of the ultrasound reception angle and/or of the pitch of the ultrasound excitation angle and/or of the pitch of the ultrasound reception angle. These criteria are therefore values linked to the illumination or reception angle of the beam of the wave.

By way of non-limiting example, the three-dimensional reconstruction criteria (7) are parameters of shape and/or of the typology of facets and/or of the number of facets and/or of the facet size of the object and/or of the behavior of the object supplied by the knowledge base (1). These are therefore criteria linked to the shape or to the representation of the object.

By way of non-limiting example the rules for optimization are of the type search for the maximum value of a parameter, of a threshold comparison, of a number of coincidences, of a time window, of a spectral signature, of a time-frequency spot, etc.

Examples of optimum criteria are given hereinbelow.

As can be seen in FIG. 1, the three-dimensional reconstruction of the object according to the invention is obtained using a knowledge base (1), at the end of four main steps during which the knowledge base is updated.

These steps are:
extraction of useful signals from the sensed signals, notably very noisy sensed signals,
identification in direct mode of useful direct information based on the useful signals,
reconstruction of useful three-dimensional information of interest by inverse processing of the useful direct information,
three-dimensional reconstruction of the object based on the useful three-dimensional information on the object.

These main steps will now be presented in detail.

The step for extraction (B1, B2, B3) of useful weak signals (11) using a part (referred to as a set) of the sensed signals (8) which could be very noisy is first considered. It is based on obtaining intermediate results: weak signals (9) and weak signals of interest (10).

It comprises several sub-steps consisting in:
extracting (A11), from the knowledge base (1), direct mode search criteria 2;
extracting (B1), from a set of sensed signals (8) filtered through the direct mode search criteria (2), signals referred to as weak signals (9);
extracting (A12), from the knowledge base (1), criteria for extraction of weak signals (3);
extracting (B2), from the weak signals (9) filtered through the criteria for extraction of the weak signals (3), signals referred to as weak signals of interest (10);
removing the noise from and, preferably, amplifying (B3) the weak signals of interest (10) in order to obtain signals referred to as useful weak signals (11).

Figure 2:
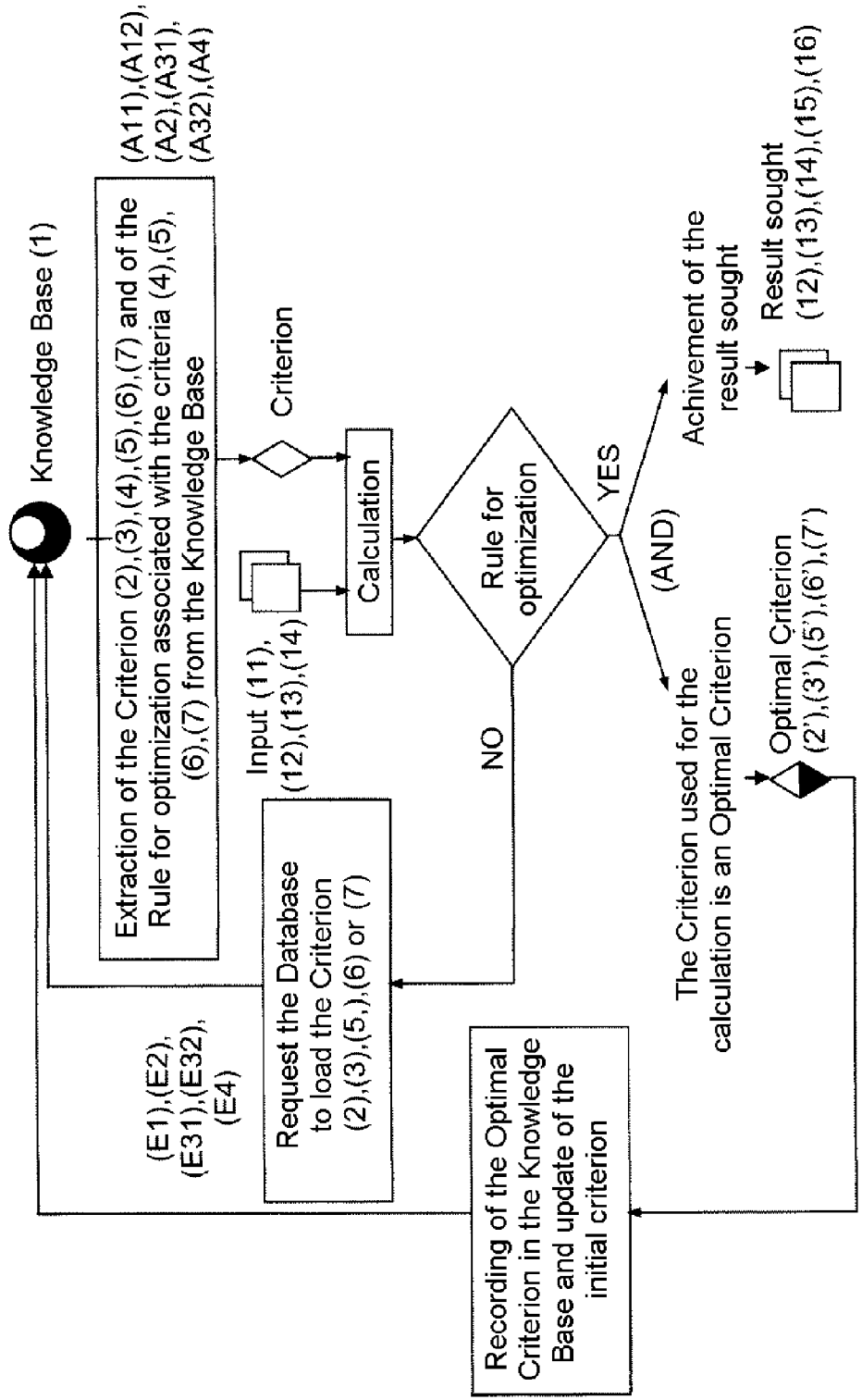
FIG. 2 is a flow diagram relating to the optimization of the criteria.

The following three main steps take place according to virtually the same scenario represented in the form of a flow diagram shown in FIG. 2.

A specific criterion for the step and its associated rule for optimization are extracted from the knowledge base (1). Optimum specific criteria are also potentially determined as will be seen; these optimum criteria are obtained starting from the specific criteria by incorporating for each one its associated rule for optimization.

If the rule for optimization of the specific criteria applied to the input data is satisfied, then:
the input data for the step are filtered by means of these specific criteria and these are the output data,
these specific criteria are optimum specific criteria,
the knowledge base (1) is updated with these optimum criteria, (this amounts to validating the specific criteria used),
otherwise, change these specific criteria in the knowledge base (1) and reiterate the extractions of the criteria, of the associated rule for optimization and the filtering with these new specific criteria.

The step (C) for identification in direct mode of useful direct information (12) based on the useful weak signals (11) obtained at the end of the preceding extraction step is next considered. The useful direct information (12) typically comprises a subset of data of the backscattered and/or scattered energy type coming from the useful weak signals (11).

It comprises the sub-steps consisting in:
extracting (A2), from the knowledge base (1), the criteria for identification in direct mode (4) and the associated rule;
if the rule for optimization of the criteria for identification in direct mode 4 is satisfied by the useful weak signals (11), then:
the extracted extraction criteria in direct mode (3) are optimum extraction criteria in direct mode (3'),
update (E1) the knowledge base (1) with said optimum extraction criteria in direct mode (3'),
the criteria for searching in extracted direct mode (2) are criteria for searching in optimum direct mode (2'),
update (E2) the knowledge base (1) with said optimum direct mode search criteria (2'),
identify (C) useful direct information (12), based on the useful weak signals (11) filtered through the criteria for identification in direct mode (4),
otherwise, change these extraction criteria for the weak signals (3) and reiterate the step for extraction (A12) of these criteria (3), the steps (B2), (B3), and (C) and the step concerning the rule for optimization of the criterion (4), and
if the rule for optimization of the criteria for identification in direct mode (4) is still not satisfied by the useful weak signals (11), then change these direct mode search criteria (2) in the knowledge base (1) and reiterate the step for extraction (A11) of these criteria (2), the steps (B1), (B2), (B3), and (C) and the step concerning the rule for optimization of the criterion (2).

By way of non-limiting example, the optimum direct mode search criteria (2') are optimum criteria on amplitude correlations and/or scattered intensity correlations and/or time sequences and/or probability densities and/or spectral signatures and/or time correlations, for which the identification (C) is carried out.

By way of non-limiting example, the optimum extraction criteria for the weak signals (3') are optimum criteria coming from the threshold and/or from the range and/or from the domain for evaluation of the direct mode search criterion, for which the identification (C) is carried out.

The step for reconstruction (D1, D2) of useful three-dimensional information of interest (14) by inverse processing of the useful direct information (12) is next considered. It is based on obtaining intermediate results: three-dimensional information of interest (13). The three-dimensional information of interest (13) forms the three-dimensional reconstruction based on the useful direct information. The useful three-dimensional information (14) represents the three-dimensional reconstruction improved by the elimination of artifacts.

It comprises the sub-steps consisting in:
extracting (A31), from the knowledge base (1), the three-dimensional observation grids (5) and the associated rule for optimization;
if the rule for optimization of the three-dimensional observation grids (5), coming from the knowledge base (1), is satisfied by the useful direct information (12), then:
these three-dimensional observation grids (5) are optimum three-dimensional observation grids (5'),
update (E31) the knowledge base (1) with said optimum three-dimensional observation grids (5');
reconstruct (D1), using the useful direct information (12) filtered through the three-dimensional observation grids (5), three-dimensional information of interest (13),
otherwise, change these three-dimensional observation grids (5) in the knowledge base (1), and reiterate the step for extraction (A31) of grids and the step concerning the rule for optimization of these new grids (5);
extracting (A32), from the knowledge base (1), the criteria for three-dimensional observation grids (6) and the associated rule for optimization,
if the rule for optimization of the criteria for three-dimensional observation grids (6), coming from the knowledge base (1), is satisfied by the three-dimensional information of interest (13), then:
these criteria for three-dimensional observation grids (6) are optimum criteria for three-dimensional observation grids (6'),
update (E32) the knowledge base (1) with said optimum criteria for three-dimensional observation grids (6'),
reconstruct (D2), using the three-dimensional information of interest (13) filtered through the criteria for three-dimensional grids (6), useful three-dimensional information (14),
otherwise, change these criteria for three-dimensional observation grids (6) in the knowledge base (1) and reiterate the step for extraction (A32) of the grid criteria and the step concerning the rule for optimization of these new criteria (6).

By way of non-limiting example, the optimum three-dimensional observation grids (5') are optimum grids linked to the angle of the illumination laser beam and/or to the angle of the reception laser beam or to the angle of the excitation ultrasound beam and/or to the ultrasound reception angle, for which the reconstruction (D1) is carried out.

By way of non-limiting example, the optimum criteria for three-dimensional observation grids (6') are optimal values of the illumination laser angle and/or of the reception laser angle and/or of the pitch of the illumination laser angle and/or of the pitch of the reception laser angle or optimal values of the ultrasound excitation angle and/or of the ultrasound reception angle and/or of the pitch of the ultrasound excitation angle and/or of the pitch of the ultrasound reception angle, for which the reconstruction (D2) is carried out.

The last step in reconstruction (D3) of three-dimensional information for the object (15) starting from the useful three-dimensional information on the object (14) is now described. The useful three-dimensional information on the object (15) corresponds to the optimal three-dimensional reconstruction of the object. The recognition state file (16) supplies, for example, information of the type "object not reconstituted" or "need to enhance the knowledge base" or "delayed operation" or "unavailability of the hardware". Finally, it is a report summary file for the reconstruction method.

It comprises the sub-steps consisting in:
extracting (A4), from the knowledge base (1), the three-dimensional reconstruction criteria (7) and the associated rule for optimization;
if the rule for optimization of the three-dimensional reconstruction criteria (7), coming from the knowledge base (1), is satisfied by the useful three-dimensional information on the object (14), then:
these three-dimensional reconstruction criteria (7) are optimum three-dimensional reconstruction criteria (7)',
update (E4) the knowledge base (1) with said optimum three-dimensional reconstruction criteria (7'),
reconstruct (D3), based on the useful three-dimensional information (14) filtered through the three-dimensional reconstruction criteria (7), three-dimensional information (15) on the object and supply a recognition state file (16),
otherwise, change these three-dimensional reconstruction criteria (7) in the knowledge base (1) and reiterate the step for extraction (A4) of the criteria for reconstruction and the step concerning the rule for optimization of these new criteria (7).

By way of non-limiting example, the optimum three-dimensional reconstruction criteria (7') are optimal values of the number of facets or of the size of each facet for which the three-dimensional reconstruction (D3) is carried out.

The steps (A11), (A12), (A2), (A31), (A32), (A4), (B1), (B2), (B3), (C), (D1), (D2) and (D3) use techniques for processing information, knowledge, data, the signal, and artificial intelligence techniques, each functionality being achieved by a specific hybridization of these techniques.

The method according to the invention is particularly intended for the control of the processes for identification of objects of interest for the management of the risks and of the performances in the following fields: natural disasters, competition, environment, industry, medical and biotechnologies, nuclear, oil, security, transport (air, road, rail, maritime), etc.

The invention claimed is:
1. A method for synthetic reconstruction of an object exposed to a wave, starting from sensed signals produced by this exposure, and from a knowledge base, wherein the knowledge base comprises various filtering criteria, namely direct mode search criteria, criteria for extraction of the weak signals, criteria for identification in direct mode, three-dimensional observation grids linked to the illumination or reception angle of the wave, criteria for three-dimensional observation grids, three-dimensional reconstruction criteria, rules for optimization associated with the criteria for identification in direct mode, with the three-dimensional observation grids, with the criteria for three-dimensional observation grids, with the three-dimensional reconstruction criteria, and corresponding optimum criteria, following said optimization rules, and wherein the method comprises the following steps:
extracting, from the knowledge base, direct mode search criteria,
extracting, from the knowledge base, criteria for extraction of the weak signals,
extracting, from the knowledge base, criteria for identification in direct mode and the associated rule for optimization,
extracting, from the knowledge base, three-dimensional observation grids and the associated rule for optimization,
extracting, from the knowledge base, criteria for three-dimensional observation grids and the associated rule for optimization, extracting, from the knowledge base, three-dimensional reconstruction criteria and the associated rule for optimization, extracting, from a set of sensed signals, filtered through the extracted direct mode search criteria, weak signals, extracting, from the weak signals filtered through the criteria for extraction of the extracted weak signals, weak signals of interest, removing the noise from the weak signals of interest so as to obtain useful weak signals, wherein if the rule for optimization of the criteria for identification in direct mode is satisfied by the useful weak signals, then:

these extracted criteria for extraction in direct mode are optimum criteria for extraction in direct mode, update the knowledge base with said optimum criteria for extraction in direct mode, the extracted direct mode search criteria are optimum direct mode search criteria, update the knowledge base with said optimum direct mode search criteria, identify useful direct information, based on the useful weak signals filtered through the criteria for identification in direct mode, otherwise, change these criteria for extraction of the weak signals and reiterate the steps for extraction of these criteria, the steps for extraction of weak signals of interest, for removing the noise from the weak signals of interest to obtain useful weak signals, and for identifying useful direct information, and the step concerning the rule for optimization of the criterion, and if the rule for optimization of the criteria for identification in direct mode is not satisfied by the useful weak signals, then change these direct mode search criteria in the knowledge base and reiterate the steps for extraction of these criteria, the steps for extracting, from a set of sensed signals, filtered through the extracted direct mode search criteria, weak signals, for extraction of weak signals of interest, for removing the noise from the weak signals of interest to obtain useful weak signals, and for identifying useful direct information and the step concerning the rule for optimization of the criterion, if the rule for optimization of the three-dimensional observation grids is satisfied by the useful direct information, then:

these extracted three-dimensional observation grids are optimum three-dimensional observation grids, update in the knowledge base, the three-dimensional observation grids with these optimum three-dimensional observation grids, reconstruct, based on the useful direct information filtered through the extracted three-dimensional observation grids, three-dimensional information of interest, otherwise, change these three-dimensional observation grids in the knowledge base, and reiterate the step for extraction of grids and the step concerning the rule for optimization of these new grids;

if the rule for optimization of the criteria for three-dimensional observation grids is satisfied by the three-dimensional information of interest, then:

these extracted criteria for three-dimensional observation grids are optimum criteria for three-dimensional observation grids, update, in the knowledge base, the criteria for three-dimensional observation grids with these optimum criteria for three-dimensional observation grids, reconstruct, based on the three-dimensional information of interest, filtered through the extracted criteria for three-dimensional grids, useful three-dimensional information, otherwise, change these criteria for three-dimensional observation grids in the knowledge base, and reiterate the step for extraction of the grid criteria and the step concerning the rule for optimization of these new criteria, if the rule for optimization of the three-dimensional reconstruction criteria is satisfied by the useful three-dimensional information, then:

these extracted three-dimensional reconstruction criteria are optimum three-dimensional reconstruction criteria, update, in the knowledge base, the three-dimensional reconstruction criteria with these optimum three-dimensional reconstruction criteria, reconstruct, based on the useful three-dimensional information, filtered through the extracted three-dimensional reconstruction criteria, three-dimensional information for the object and determine a recognition state file, otherwise, change these three-dimensional reconstruction criteria in the knowledge base and reiterate the step for extraction of the criteria for reconstruction and the step concerning the rule for optimization of these new criteria.

2. The method as claimed in claim 1, wherein the step for removing the noise from the weak signals of interest to obtain useful weak signals also comprises a step for amplification of the noise-free signals.

3. The method as claimed in claim 1, wherein the object is exposed to an electromagnetic wave.

4. The method as claimed in claim 3, wherein the object is exposed to a laser beam whose wavelength is that in a range going from the visible to the infrared, or to microwaves.

5. The method as claimed in claim 1, wherein the object is exposed to an elastic wave.

6. The method as claimed claim 5, wherein the object is exposed to an elastic wave in the range of ultrasounds or of sounds or of infrasounds.

7. The method as claimed in claim 1, wherein the direct mode search criteria are criteria coming from amplitude correlations and/or from scattered intensity correlations and/or from time sequences and/or from probability densities and/or from spectral signatures and/or from time correlations.

8. The method as claimed in claim 1, wherein the criteria for extraction of the weak signals are criteria coming from a threshold and/or from a range and/or from a domain of evaluation of the direct mode search criterion.

9. The method as claimed in claim 1, wherein the three-dimensional observation grids are grids linked to the angle of the illumination laser beam and/or to the angle of the reception laser beam or to the angle of the excitation ultrasound beam and/or to the ultrasound reception angle.

10. The method as claimed in claim 1, wherein the criteria for three-dimensional observation grids are values of the illumination laser angle and/or of the reception laser angle and/or of the pitch of the illumination laser angle and/or of the pitch of the reception laser angle or values of the ultrasound excitation angle and/or of the ultrasound reception angle and/or of the pitch of the ultrasound excitation angle and/or of the pitch of the ultrasound reception angle.

11. The method as claimed in claim 1, wherein the three-dimensional reconstruction criteria are parameters of shape and/or of the typology of facets and/or of the number of facets and/or of the facet size of the object and/or of the behavior of the object supplied by a reference database and/or knowledge base.

12. The method as claimed in claim 1, wherein the useful direct information comprises a data subset of the backscattered and/or scattered energy type corresponding to the object extracted from the useful weak signals.

13. The method as claimed in claim 1, wherein the useful three-dimensional information is the three-dimensional reconstruction improved by the elimination of artifacts.

14. The method as claimed in claim 1, wherein the three-dimensional information on the object is the optimal three-dimensional reconstruction of the object.

15. The method as claimed in claim 1, wherein the recognition state file comprises information of the type: "object not reconstituted" or "need to enhance the knowledge base" or "delayed operation" or "unavailability of the hardware".

16. The method as claimed in claim 1, wherein the rules for optimization are of the type search for the maximum value of a parameter, or for a threshold comparison, or for a number of coincidences, or for a time window, or for a spectral signature, or for a time-frequency spot.

17. The method as claimed in claim 1, wherein the weak signals are signals for which the signal/noise ratio is low and/or the amplitude or the intensity is low and/or the information contained is fragmented and/or the information contained is composed of micro-events in coincidence or in occurrence.

* * * * *